United States Patent [19]

Randall

[11] Patent Number: 5,024,563
[45] Date of Patent: Jun. 18, 1991

[54] CUTTING APPARATUS

[75] Inventor: Joseph G. Randall, Concord, Mass.

[73] Assignee: North East Form Engineering, Inc., Lowell, Mass.

[21] Appl. No.: 404,952

[22] Filed: Sep. 8, 1989

[51] Int. Cl.⁵ .............................................. B23B 51/00
[52] U.S. Cl. .................................... 408/1 R; 407/48; 408/188; 408/713; 408/144; 411/412
[58] Field of Search ............... 408/1 R, 713, 144, 145, 408/233, 187, 188, 197, 198; 407/104, 103, 48; 411/394, 412

[56] References Cited

U.S. PATENT DOCUMENTS 3,876,319 4/1975 Meyer .............................. 411/412 X
3,963,366 6/1976 Eckle et al. ...................... 408/713 X Primary Examiner—Z. R. Bilinsky
Attorney, Agent, or Firm—Hamilton, Brook, Smith & Reynolds

[57] ABSTRACT

Boring apparatus includes a multiple start screw to secure a cutting piece to a boring bar. The multiple start screw prevents loosening of the cutting piece during use of the boring apparatus. The multiple start screw also enables easy changing of the cutting piece or repositioning of the cutting piece between periods of use of the apparatus.

9 Claims, 1 Drawing Sheet

CUTTING APPARATUS

BACKGROUND OF THE INVENTION

Many processes for shaping metal, wood or other materials involve the removal of material by cutting or similar operations. The tools used to perform the cutting operations are made of special steels (tool steels), hard metals (cemented carbide alloys), oxide ceramic materials and diamonds.

Two of the most important machining processes are turning and boring. Turning is the process of reducing the diameter of material held in a lathe. The piece of material as a workpiece is attached to a driven spindle and, while rotating, is brought into contact with a cutting or turning tool. The position of the tool in relation to the axis of rotation is varied to cut the workpiece to the desired shape. The cutting may be on an external or internal surface of the workpiece.

Boring, or more generally drilling, is a rotary cutting operation for producing holes in the desired material. The boring tool provides a cutting edge which while rotating is fed forward under pressure into the subject material. Alternatively, a bar feed machine is used which holds the boring tool stationary and enables the material to be applied to the tool while the material is rotated. Different boring tools (i.e. cutting edges of a boring tool) produce holes of different diameters and lengths. Holes in the range of about 0.02 inch to about 1 inch diameter and 0.1 inch to about 1¼ inches in length are typically produced.

Turning and boring tools are available in a wide range of shapes and types. Generally, the tool has a handle or shaft serially connected to a shank to form what is commonly referred to as a boring bar or turning holder. The distal or head end of the shank provides the cutting edge or an attached cutting tip. Typically the handle and shank are formed of high carbon steel, hardened and tempered. Alloys known as high-speed steels are used for tools that are operated at relatively high cutting speeds. The cutting tip is made of a cemented carbide, for example, or particularly tungsten carbide.

In recent years, small carbide inserts have been employed on boring bars or turning holders for metal removal. The carbide insert is generally triangular or square in shape with a hole through the center. A screw passes through the hole into the distal end of the bar/holder to fasten the carbide insert thereto. The insert is positioned such that one corner of the insert is "exposed" and used as a cutting edge. As the corner is worn to the point of no longer being effective, the screw is loosened and the insert is rotated to position and expose an unused corner for cutting. The screw is retightened and the tool is ready to use. This process is repeated until all the corners are dull. The insert is then replaced.

One disadvantage of these insert cutting tools is that the screw may become loose during operation of the tool, resulting in slippage of the insert and ineffective machining. Many tool manufacturers have added a small clamp in addition to the screw to assist in securing the insert on a turning holder. However, such a clamp in boring tools is impractical since there is a lack of space for the clamp. That is, a boring bar usually functions within the confines of a hole not much larger in diameter than the diameter of the boring bar itself. Hence, the added bulk of a clamp is inconsistent with the minimization of boring bar dimensions to enable use in constricted areas.

SUMMARY OF THE INVENTION

The present invention provides cutting apparatus which overcomes the problems of prior art boring tools. In particular, the present invention boring apparatus includes a handle, a cutting piece and a multiple start screw for fastening the cutting piece to a distal end of the handle. The multiple start screw is less likely to become loose than single start screws of the prior art and, hence, secures the cutting piece in a manner which prevents slippage or relative movement between the cutting piece and the handle.

In accordance with one aspect of the present invention, the cutting piece has a plurality of working edges. The multiple start screw secures the cutting piece to the handle in a manner which exposes one of the working edges. That working edge serves as a cutting edge of the apparatus until the edge becomes dull. At that time, the multiple start screw is loosened to unsecure the cutting piece from the handle. The cutting piece is repositioned on the handle to expose a different/new working edge and, hence, to provide a different cutting edge for the apparatus. The multiple start screw is retightened to secure the cutting piece as repositioned to the handle. Each time the current cutting edge needs replacement, the steps of loosening the screw, repositioning the cutting piece and retightening the screw are repeated to expose a different working edge of the cutting piece, as a new cutting edge for the apparatus.

In a preferred embodiment, the multiple start screw is a double start screw. The cutting piece comprises carbide and the handle comprises tungsten steel, carbide, tool steel and/or other hard steel material.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2b is an end view of the multiple start screw of FIG. 2a.

DETAILED DESCRIPTION OF THE PREFERRED EMBODIMENT

Figure 1:
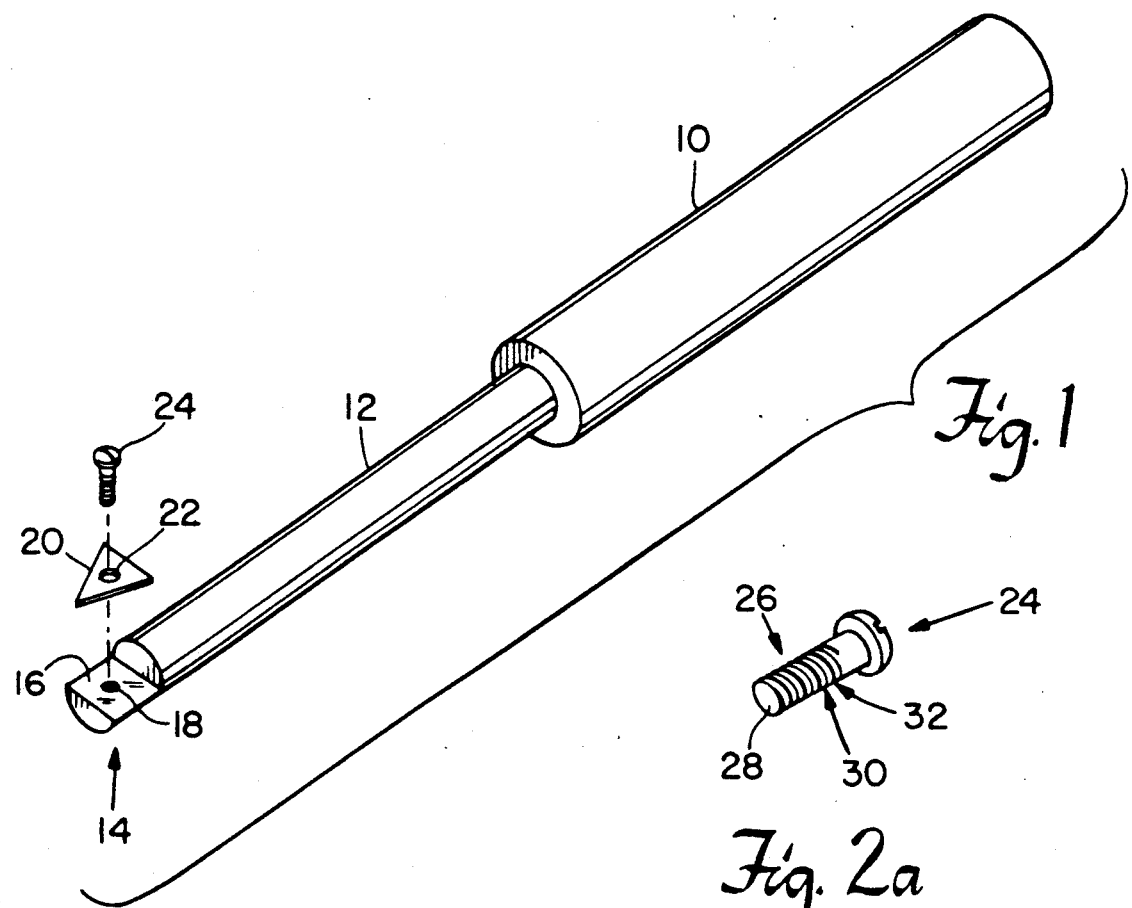
FIG. 1 is an exploded view of a boring apparatus which embodies the present invention.

Provided in FIG. 1 for purposes of illustration and not limitation is an exploded view of boring apparatus which embodies the present invention. The apparatus includes a boring bar with a distal end 14 which is adapted to hold a cutting piece 20 or as known in the art a changeable insert or bit. A multiple start screw 24 secures the cutting piece 20 to the boring bar as described later.

The boring bar is formed of a shaft 10 and shank 12. The shaft 10 is preferably of carbide or tool steel, and is braised to one end of shank 12 which is preferably of steel or tungsten steel. Other materials for shaft 10 or shank 112 are suitable.

The shaft 10 is generally cylindrical and provides a proximal or gripping end of the boring apparatus, i.e. the end which is clamped into a machine for boring. Shank 12 is generally cylindrical with an outer diameter small than the outer diameter of shaft 10. The end of shank 12 which is opposite the end connected to shaft 10 is the distal end of the apparatus and generally indicated at 14. The distal end 14 is generally formed with an upper planar surface which is adapted to carry or hold cutting piece 20.

In the upper planar surface of distal end 14 there is an angular pocket 16 in which the cutting piece 20 sits. With the aperture 22 of cutting piece 20 aligned with the threaded aperture 18 in pocket 16, multiple start screw 24 passes through apertures 22 and 18 and tightens the cutting piece 20 securely into pocket 16.

Cutting piece 20 is of general manufacture, such as the type manufactured by Valenite Corp. of Madison Heights, MI, Adamas Corp. of Kenilworth, NJ, Kennametal Corp. of Latrobe, PA, Carbaloy, Inc. of Detroit, MI and others. The cutting piece 20 may be of any shape but is usually triangular or rectangular in shape and of various sizes as known in the art. The diameter of aperture 22 of cutting piece 20 is dependent on the size of the cutting piece. The diameter of aperture 18 of the boring bar is made to match the diameter of aperture 22 of cutting piece 20. Also, threads are cut into the aperture 18 of the boring bar to match the threading of the multiple start screw 24.

Figure 2A:
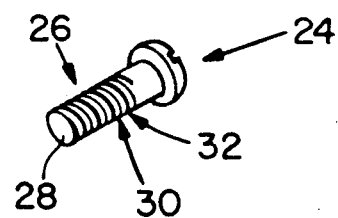
FIG. 2a is a perspective view of a multiple start screw of the apparatus of FIG. 1.
Figure 2B:
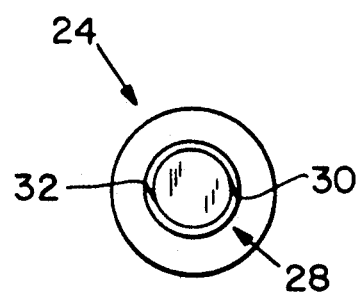

Outer diameter and thread size of multiple start screw 24 is chosen according to the diameter of apertures 22 and 18. For example, thread sizes of 1-72, 4-40 and 2-56 are employed for the different possible cutting pieces 20 used. As shown in FIGS. 2a and 2b, the multiple start screw 24 has at least two threads. Each thread starts at a circumferential position on the end 28 of the screw equidistant from the starting positions of the other threads. For example, in the case of a double start screw, illustrated in FIGS. 2a and 2b, there are two threads 30, 32 along the body 26 of screw 24. One thread is illustrated by a heavier line than the line which represents the other thread. One thread 30 starts at a position 180° around the end 28 of the screw 24 from the starting position of the other thread 32 as shown in FIG. 2b, the end view of screw 24.

The multiple threads on the body of screw 24 enable holding pressures to be equally exerted on different sides of the screw 24 with the screw tightened (screwed) into boring bar aperture 18. Hence, the multiple start screw 24 secures cutting piece 20 to the boring bar with pressures equally exerted about the circumference of apertures 22 and 18 to more effectively hold cutting piece 20 in place on the distal end 14 of the boring bar. It is this secured holding of the cutting piece 20 to the boring bar, without the use of a clamp, which enables the boring apparatus of the present invention to overcome the prior art problems of the cutting piece loosening during use. Because the present invention boring apparatus avoids the use of a clamp, it is further suitable for confined areas of desired use.

Multiple start screws 24 which are suitable for the invention are generally of, or similar to the type used in precision measuring and positioning equipment. Manufacture of multiple start screw 24 is by known methods such as according to the mathematical formulas disclosed on reference Pages 201, 202 and 204 of *Precision Measuring Tools, Handbook No. 36*, published by Van Keuren Company, Watertown, MA, 1961 which is herein incorporated by reference.

It is understood that the foregoing described boring bar may be of different sizes and design such that the distal end 14 enables use in different size areas. In particular, for desired areas of use of less than about two inch diameter, the boring bar does not have a pocket in the upper planar surface of the distal end 14. Further, the shaft 10 and shank 12 which form the boring bar of FIG. 1 are braised together to minimize vibration throughout the boring bar during use. However, other methods of connection are suitable. The materials chosen for the boring bar and cutting piece are for rigidity and integrity of the apparatus. Other materials are known to be suitable.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. Boring apparatus comprising:
   a cutting piece having an aperture therethrough;
   a handle having one end adapted to hold the cutting piece, the one end having an aperture alignable with the cutting piece aperture; and
   a multiple start screw disengageably positioned in the apertures of the cutting piece and handle, for securing the cutting piece to the one end of the handle in a manner which prevents loosening and relative movement between the cutting piece and the handle during use by exerting from different sides of the screw equal pressures to the cutting piece.

2. Boring apparatus as claimed in claim 1 wherein:
   the cutting piece provides a plurality of working edges, each working edge being a cutting edge;
   the multiple start screw enables securing to the handle the cutting piece in different positions such that a different working edge serves as cutting edge of the apparatus.

3. Boring apparatus as claimed in claim 1 wherein the multiple start screw is a double start screw.

4. Boring apparatus as claimed in claim 1 wherein the cutting piece comprises carbide.

5. Boring apparatus as claimed in claim 1 wherein the handle comprises at least one of steel and carbide.

6. Boring apparatus of the type having a handle with a distal end adapted to hold a cutting piece, the apparatus further comprising:
   a multiple start screw passing through an aperture in the cutting piece to an aperture in the distal end of the handle to secure the cutting piece to the end of the handle in a manner which prevents loosening and relative movement between the cutting piece and handle during use.

7. Boring apparatus as claimed in claim 6 wherein the multiple start screw is a double start screw.

8. A method of boring comprising the steps of:
   positioning a cutting piece to a desired cutting position on a handle adapted to hold the cutting piece, the cutting piece having an aperture therethrough and the handle having an aperture alignable with the cutting piece aperture;
   securing the cutting piece, in the desired cutting position, to the handle with a multiple start screw disengageably positioned in the apertures of the cutting piece and handle, the multiple start screw exerting equal pressures from different sides of the screw to the cutting piece to enhance securing and prevent slippage during use, said securing forming a boring tool; and operating the boring tool on material of interest to bore desired holes in the material.

9. A method as claimed in claim 8 further comprising the steps of:

loosening the multiple start screw to unsecure the cutting piece;

repositioning the cutting piece to a second cutting position; and securing the cutting piece in the second cutting position to the handle with the multiple start screw such that boring is enabled with the cutting piece in the second cutting position.

* * * * *